US012413023B2

(12) United States Patent
Fan et al.

(10) Patent No.: US 12,413,023 B2
(45) Date of Patent: Sep. 9, 2025

(54) ELECTRICAL CONNECTOR WITH IMPROVED GROUNDING PIECE

(71) Applicant: Luxshare Precision Industry Company Limited, Shenzhen (CN)

(72) Inventors: Min Fan, Shenzhen (CN); Yingbin Pu, Shenzhen (CN); Cunting Huang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 277 days.

(21) Appl. No.: 18/221,555

(22) Filed: Jul. 13, 2023

(65) Prior Publication Data

US 2024/0146000 A1 May 2, 2024

(30) Foreign Application Priority Data

Nov. 2, 2022 (CN) ........................ 202211360617.5

(51) Int. Cl.
*H01R 13/6582* (2011.01)
*H01R 13/6592* (2011.01)
*H01R 24/60* (2011.01)

(52) U.S. Cl.
CPC ..... *H01R 13/6582* (2013.01); *H01R 13/6592* (2013.01); *H01R 24/60* (2013.01)

(58) Field of Classification Search
None
See application file for complete search history.

(56) References Cited

U.S. PATENT DOCUMENTS

2017/0085037 A1* 3/2017 Chen .................. H01R 13/6461
2021/0091523 A1* 3/2021 Chang .................... H01R 13/26
2022/0123509 A1 4/2022 Li et al.
(Continued)

FOREIGN PATENT DOCUMENTS

CN 201117912 Y 9/2008
CN 201178210 Y 1/2009
(Continued)

OTHER PUBLICATIONS

Korean Notice of Allowance for Korean Application No. 20-2023-0001657, dated May 16, 2025, with English translation.

*Primary Examiner* — Oscar C Jimenez
(74) *Attorney, Agent, or Firm* — Birch, Stewart, Kolasch & Birch, LLP

(57) ABSTRACT

An electric connector includes an insulating body, a first terminal module, a second terminal module and a grounding piece. The first terminal module includes a number of first conductive terminals each having a first tail portion. The second terminal module includes a number of second conductive terminals each having a second tail portion. The ground piece includes a first grounding tab and a second grounding tab. The first conductive terminals include a first ground terminal. The second conductive terminals include a second ground terminal. The first grounding tab is stacked on and in contact with the first tail portion of the first ground terminal. The second grounding tab is stacked on and in contact with the second tail portion of the second ground terminal. Such an arrangement simplifies the structure of the grounding piece, and can also realize a shielding function.

20 Claims, 16 Drawing Sheets

(56) References Cited

U.S. PATENT DOCUMENTS

| | | | |
|---|---|---|---|
| 2022/0123510 A1 | 4/2022 | Li et al. | |
| 2024/0145999 A1* | 5/2024 | Huang | H01R 13/6585 |

FOREIGN PATENT DOCUMENTS

| | | | |
|---|---|---|---|
| CN | 213071650 U | 4/2021 | |
| CN | 113161792 A | 7/2021 | |
| KR | 10-2018-0136865 A | 12/2018 | |
| TW | I413318 B | 10/2013 | |
| TW | M613621 U | 6/2021 | |

* cited by examiner

ELECTRICAL CONNECTOR WITH IMPROVED GROUNDING PIECE

CROSS-REFERENCE TO RELATED APPLICATION

This patent application claims priority of a Chinese Patent Application No. 202211360617.5, filed on Nov. 2, 2022 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

With the increasing requirements of the electrical connector for data transmission quality, how to reduce the interference problem of conductive terminals in the process of data transmission is a technical problem to be solved by those of ordinary skill in the art. In order to solve the above problem, the electrical connector in the relevant technology is also provided with a grounding piece which has a plurality of ground terminals. However, this design leads to a more complicated structure of the grounding piece and is not easy to manufacture.

SUMMARY

An object of the present disclosure is to provide an electrical connector with simple structure and shielding performance.

In order to achieve the above object, the present disclosure adopts the following technical solution: an electrical connector, including: an insulating body, the insulating body including a mating surface, a mounting surface opposite the mating surface, a mating slot extending through the mating surface, and a mounting space extending through the mounting surface; the mounting space being in communication with the mating slot; a first terminal module, the first terminal module including a first insulating block and a plurality of first conductive terminals, each first conductive terminal including a first fixing portion fixed to the first insulating block, a first resilient arm extending from the first fixing portion, and a first tail portion; the first resilient arm being provided with a first contact portion extending into the mating slot; a second terminal module, the second terminal module including a second insulating block and a plurality of second conductive terminals, each second conductive terminal including a second fixing portion fixed to the second insulating block, a second resilient arm extending from the second fixing portion, and a second tail portion, the second resilient arm being provided with a second contact portion extending into the mating slot, the first contact portions of the first conductive terminals and the second contact portions of the second conductive terminals being located on opposite sides of the mating slot, respectively; and a grounding piece, the grounding piece including a body portion and a plurality of grounding tabs connected to the body portion, the plurality of grounding tabs including a first grounding tab and a second grounding tab; wherein the first tail portions of the plurality of first conductive terminals and the second tail portions of the plurality of second conductive terminals are located on a same side and arranged in a row in a first direction; the plurality of first conductive terminals include a first ground terminal; the plurality of second conductive terminals include a second ground terminal; the first grounding tab is stacked at least partially on the first tail portion of the first ground terminal and is in contact with the first tail portion of the first ground terminal; and the second grounding tab is stacked at least partially on the second tail portion of the second ground terminal and is in contact with the second tail portion of the second ground terminal.

In order to achieve the above object, the present disclosure adopts the following technical solution: an electrical connector, including: an insulating body including a mating surface and a mating slot extending through the mating surface; a first terminal module including a plurality of first conductive terminals, each first conductive terminal including a first resilient arm and a first tail portion, the first resilient arm being provided with a first contact portion extending into the mating slot; a second terminal module including a plurality of second conductive terminals, each second conductive terminal including a second resilient arm and a second tail portion, the second resilient arm being provided with a second contact portion extending into the mating slot, the first contact portions of the first conductive terminals and the second contact portions of the second conductive terminals being located on opposite sides of the mating slot, respectively; a grounding piece including a body portion and a plurality of grounding tabs connected to the body portion, the plurality of grounding tabs including a first grounding tab and a second grounding tab; and a plurality of cables, part of the plurality of cables being connected to part of the first tail portions of the first conductive terminals, and another part of the plurality of cables are connected to part of the second tail portions of the second conductive terminals; the plurality of cables including a ground cable connected to the body portion; wherein the first tail portions of the plurality of first conductive terminals and the second tail portions of the plurality of second conductive terminals are located on a same side and arranged in a row in a first direction; the plurality of first conductive terminals include a first ground terminal; the plurality of second conductive terminals include a second ground terminal; the first grounding tab is stacked at least partially on the first tail portion of the first ground terminal and is in contact with the first tail portion of the first ground terminal; and the second grounding tab is stacked at least partially on the second tail portion of the second ground terminal and is in contact with the second tail portion of the second ground terminal.

Compared to the prior art, the present disclosure includes the plurality of first conductive terminals having the first ground terminal and the plurality of second conductive terminals having the second ground terminal. The grounding piece includes the first grounding tab and the second grounding tab. By making the first grounding tab and the second grounding tab contact the first tail portion of the first ground terminal and the second tail portion of the second ground terminal, respectively, it simplifies the structure of the grounding piece and also enables a shielding function.

DETAILED DESCRIPTION

Figure 1:
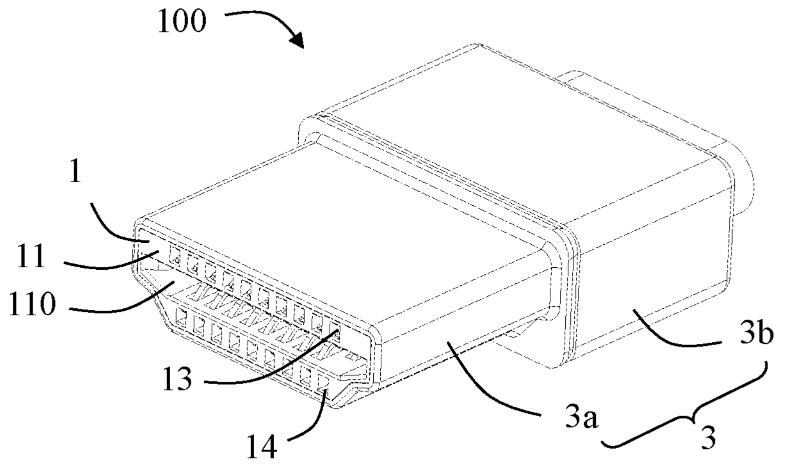
FIG. 1 is a perspective schematic view of an electrical connector in accordance with an embodiment of the present disclosure.
Figure 2:
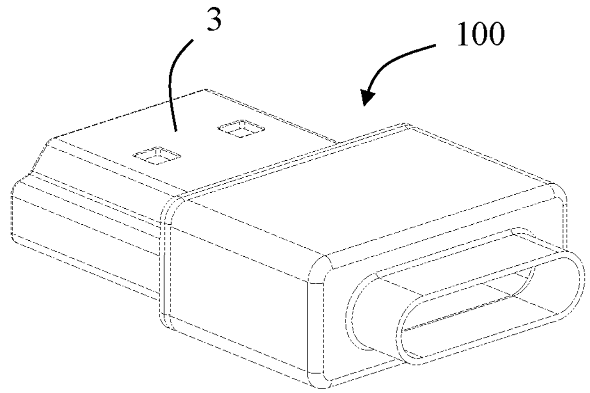
FIG. 2 is a perspective schematic view of FIG. 1 at another angle.
Figure 3:
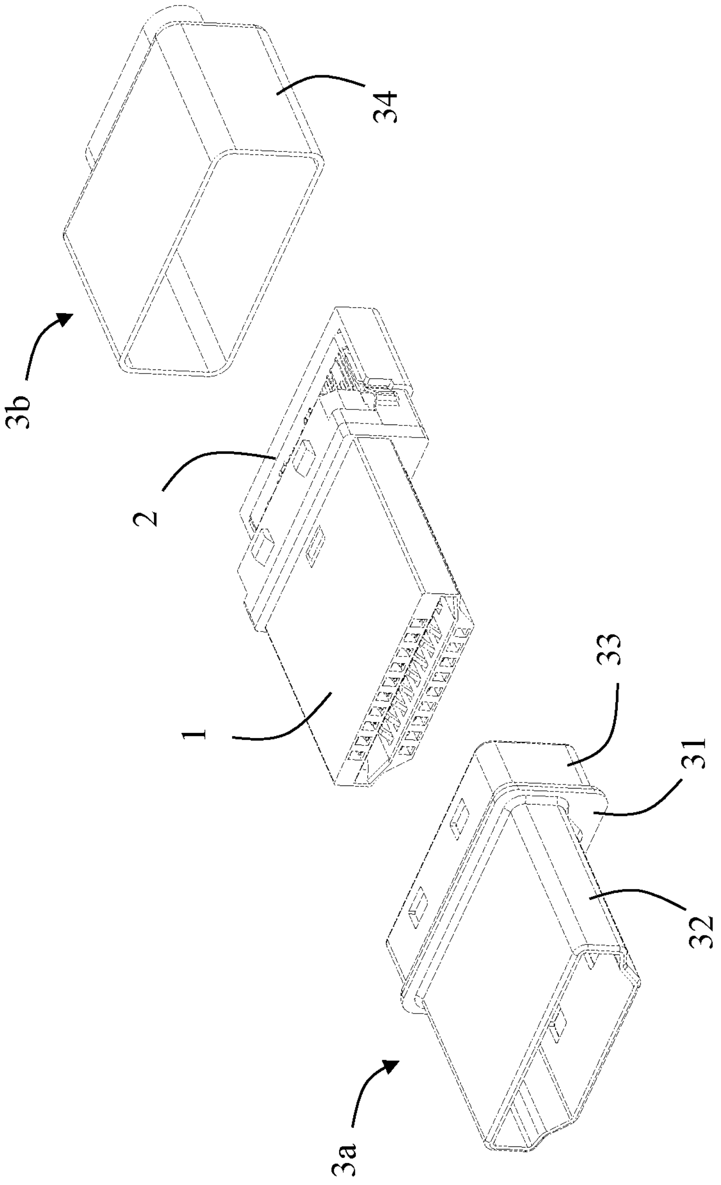
FIG. 3 is a partially perspective exploded view of FIG. 1.
Figure 4:
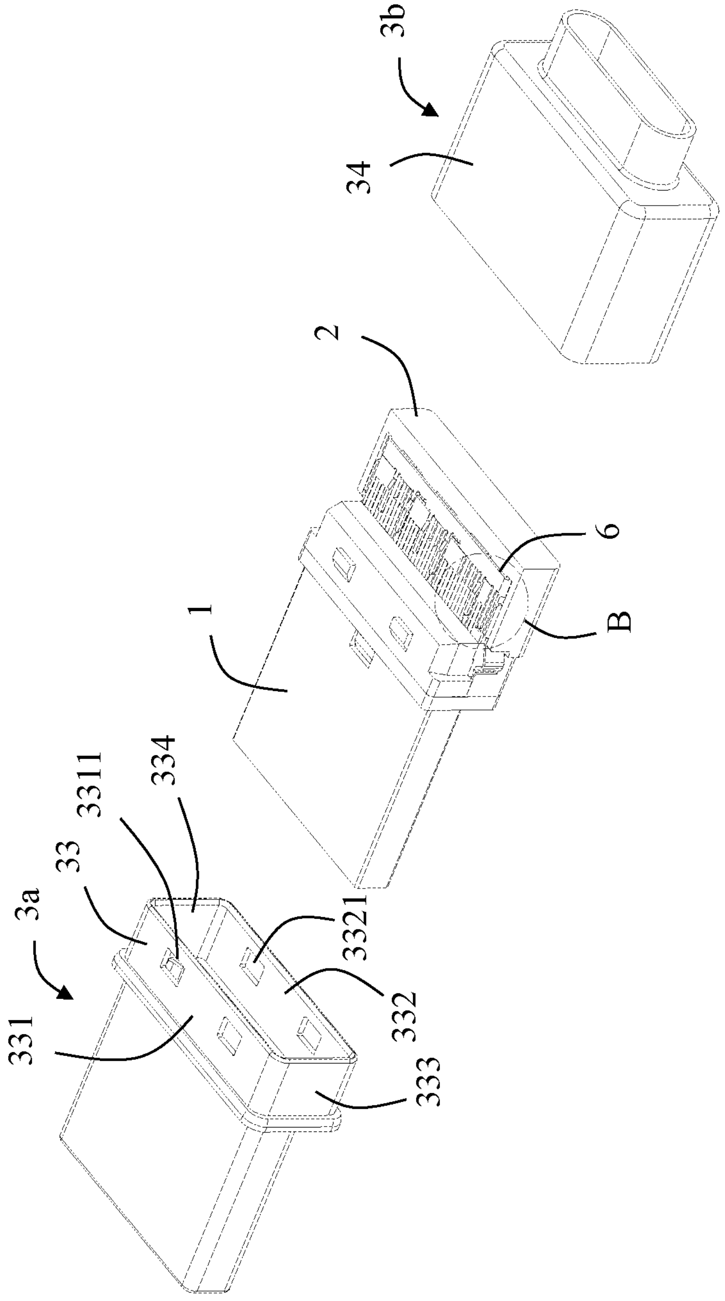
FIG. 4 is a partially perspective exploded view of FIG. 3 at another angle.
Figure 5:
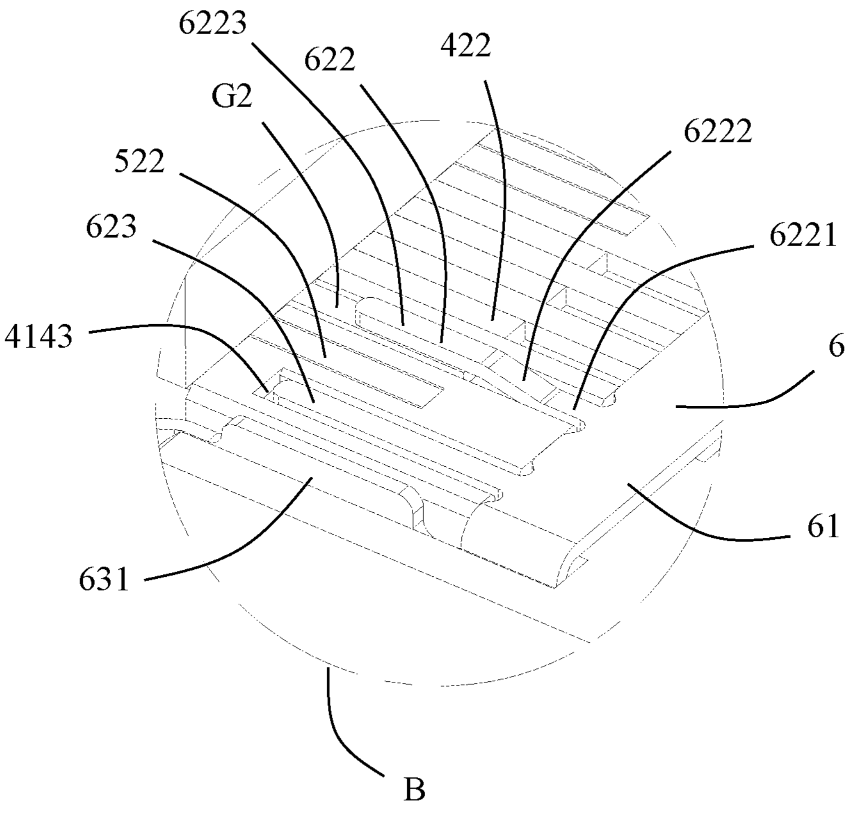
FIG. 5 is a partially enlarged view of a circled portion B of FIG. 4.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 7, the present disclosure discloses an electrical connector 100 including an insulating body 1, a terminal module 2 at least partially mounted to the insulating body 1, and a metal shell 3 wrapped around the insulating body 1. In the embodiment illustrated in the present disclosure, the electrical connector 100 is an HDMI cable connector. The electrical connector 100 is configured to connect a plurality of cables 200. Of course, it is understandable to those skilled in the art that in other embodiments, the electrical connector 100 can also be other types of electrical connectors.

Referring to FIGS. 1 to 4, in the embodiment illustrated in the present disclosure, the metal shell 3 includes a first metal shell **3*a* and a second metal shell 3*b* mating with the first metal shell 3*a*. The first metal shell 3*a* and the second metal shell 3*b* are sleeved on the insulating body 1. The first metal shell 3*a* is of a one-piece configuration and made of a metal material. The first metal shell 3*a* includes a flange portion 31, a sleeve portion 32 extending forwardly from the flange portion 31, and a holding portion 33 extending backwardly from the flange portion 31. In the embodiment illustrated in the present disclosure, the sleeve portion 32 has a shape and dimensions conforming to HDMI standards. The flange portion 31 protrudes peripherally from the sleeve portion 32 so as to be able to prevent the sleeve portion 32 from being excessively inserted into a mating connector (not shown). The holding portion 33 has a top wall 331, a bottom wall 332 opposite to the top wall 331, a first side wall portion 333 connecting the top wall 331 and the bottom wall 332 on one side, and a second side wall portion 334 connecting the top wall 331 and the bottom wall 332 on the other side. The bottom wall 332 is provided with a first locking hole 3321. The top wall 331 is provided with a second locking hole 3311. Both the first locking hole 3321 and the second locking hole 3311 are configured to lock with the terminal module 2 so as to prevent the terminal module 2 from detaching from the first metal shell 3*a***.

The second metal shell **3*b* includes a sleeve section 34. The sleeve section 34 is sleeved to the holding portion 33 of the first metal shell 3*a***.

Figure 6:
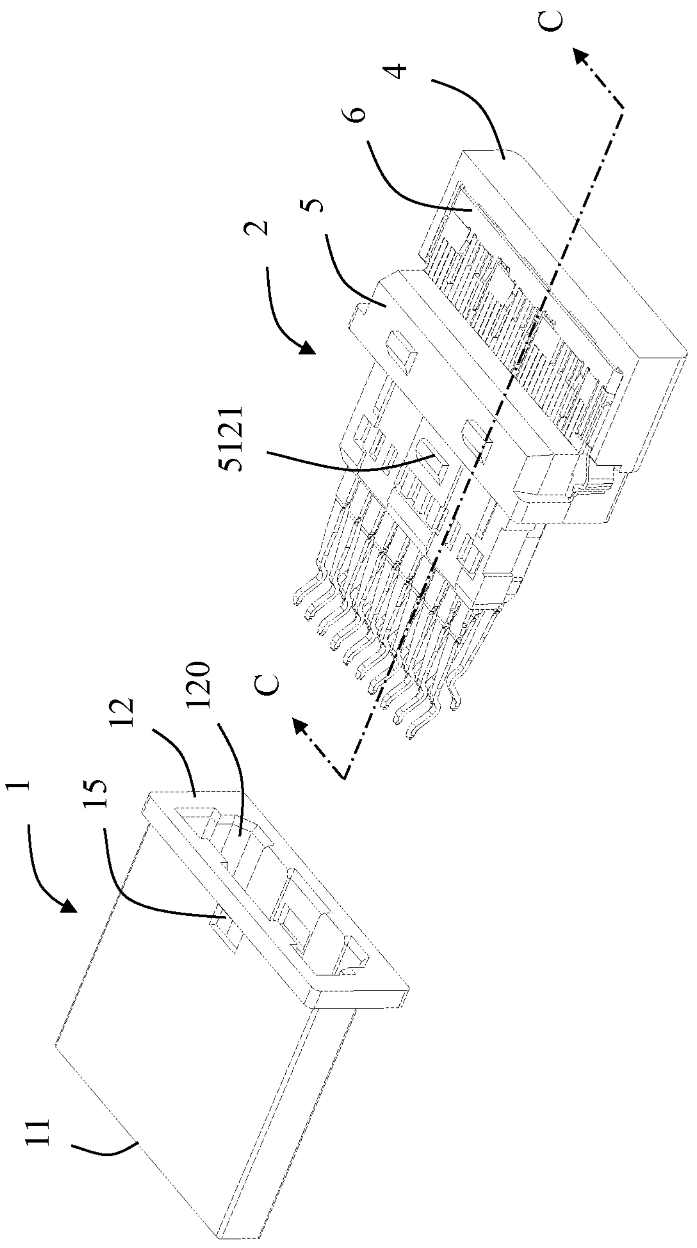
FIG. 6 is a perspective exploded view of a terminal module and an insulating body in FIG. 4.
Figure 7:
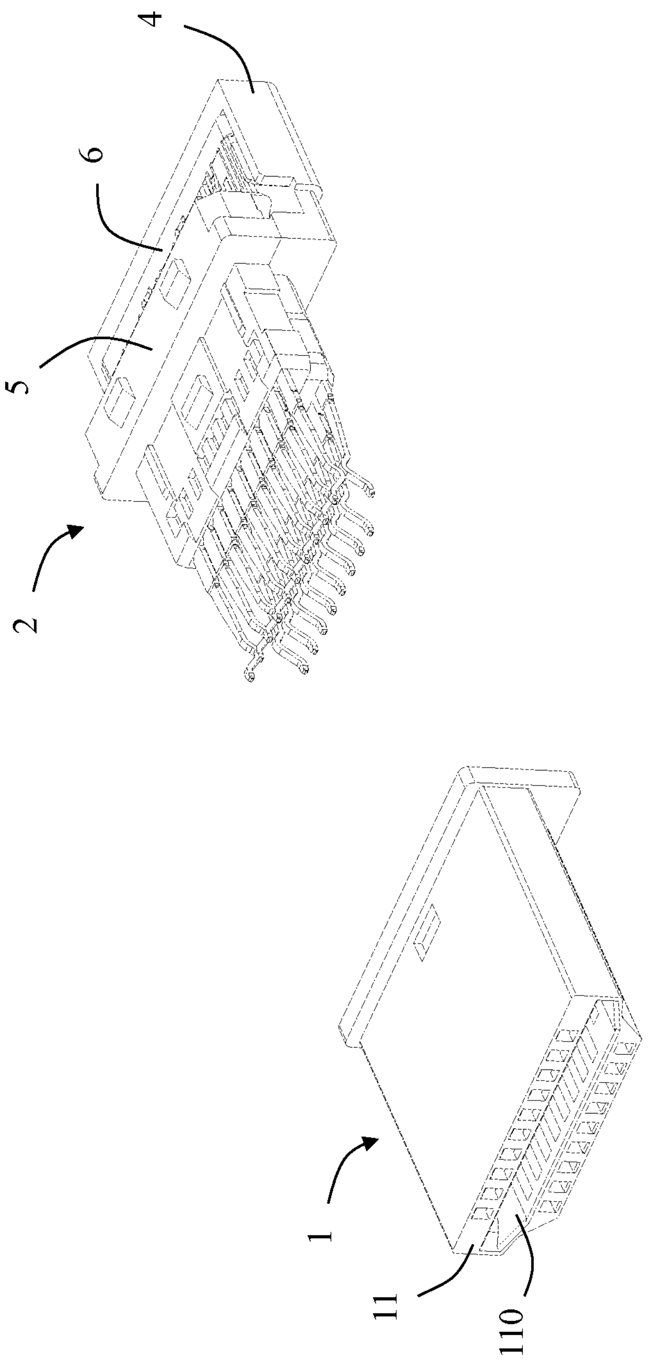
FIG. 7 is a perspective exploded view of FIG. 6 at another angle.

Referring to FIGS. 1, 6 and 7, the insulating body 1 includes a mating surface 11, a mounting surface 12 opposite to the mating surface 11, a mating slot 110 extending forwardly through the mating surface 11, and a mounting space 120 extending backwardly through the mounting surface 12. The mounting space 120 is in communication with the mating slot 110. The terminal module 2 is mounted forwardly from the mounting surface 12 into the mounting space 120. Besides, the insulating body 1 is provided with a plurality of first terminal receiving slots 13 in communication with the mating slot 110 and a plurality of second terminal receiving slots 14 in communication with the mating slot 110. The first terminal receiving slots 13 and the second terminal receiving slots 14 are located on opposite sides (e.g., a lower side and an upper side) of the mating slot 110 along a thickness direction of the insulation body 1. The first terminal receiving slots 13 and the second terminal receiving slots 14 are staggered along the thickness direction of the insulating body 1. In the embodiment illustrated in the present disclosure, the first terminal receiving slots 13 and the second terminal receiving slots 14 are provided further extending forwardly through the mating surface 11. As a result, the first terminal receiving slots 13 and the second terminal receiving slots 14 can be designed longer so as to provide better heat dissipation to the conductive terminals of the terminal module 2.

Referring to FIGS. 6 and 7, in the embodiment illustrated in the present disclosure, the insulating body 1 is further provided with a locking opening 15 for locking with the terminal module 2.

Referring to FIGS. 6 to 14, the terminal module 2 includes a first terminal module 4, a second terminal module 5, and a grounding piece 6.

The first terminal module 4 includes a first insulating block 41 and a plurality of first conductive terminals 42 fixed to the first insulating block 41. In the illustrated embodiment of the present disclosure, the plurality of first conductive terminals 42 are insert-molded with the first insulating block 41. Of course, in other embodiments, the plurality of first conductive terminals 42 may also be fixed to the first insulating block 41 by assembling.

Similarly, the second terminal module 5 includes a second insulating block 51 and a plurality of second conductive terminals 52 fixed to the second insulating block 51. In the illustrated embodiment of the present disclosure, the plurality of second conductive terminals 52 are insert-molded with the second insulating block 51. Of course, in other embodiments, the plurality of second conductive terminals 52 may also be fixed to the second insulating block 51 by assembling.

The first insulating block 41 includes a first base portion 411 and a first protruding portion 412 extending forwardly from the first base portion 411. The first protruding portion 412 is provided with a plurality of positioning posts 413. The first base portion 411 is provided with a boss 414. The boss 414 includes an assembly surface 4141, a plurality of receiving grooves 4142 recessed downwardly from the assembly surface 4141, and a recess 4143 recessed downwardly from the assembly surface 4141. The recess 4143 is located at the outermost side of the plurality of receiving grooves 4142.

The first base portion 411 includes a first locking protrusion 4110 locked in the first locking hole 3321. In addition, the first base portion 411 also includes a first side wall surface 4111, a second side wall surface 4112 opposite to the first side wall surface 4111, a first installation groove 4113 recessed downwardly from the assembly surface 4141 and partly extending through the first side wall surface 4111 to one side, and a second installation groove 4114 recessed downwardly from the assembly surface 4141 and partly extending through the second side wall surface 4112 to the other side.

Each first conductive terminal 42 is provided with a first fixing portion 423 fixed in the first insulating block 41, a first resilient arm 421 extending forwardly from a front end of the first fixing portion 423, a first bent portion 424 bent upwardly from a rear end of the first fixing portion 423, and a first tail portion 422 extending backwardly from the first bent portion 424. The first resilient arm 421 extends forwardly beyond the first insulating block 41. The first resilient arm 421 is cantilevered and extends into the mating slot 110. The first resilient arm 421 is provided with a first contact portion 4211 for electrically mating with the mating connector. A plane in which the first tail portion 422 is located is higher than a plane in which the first fixing portion 423 is located. This design facilitates better exposure of the first tail portions 422 to the assembly surface 4141.

The second insulating block 51 includes a second base portion 511 and a second protruding portion 512 extending forwardly from the second base portion 511. The second protruding portion 512 is provided with a plurality of positioning holes 513 for receiving the positioning posts 413. The second base portion 511 includes a second locking protrusion 5110 locked in the second locking hole 3311. The second locking protrusion 512 further includes a locking projection 5121 locked in the locking opening 15 of the insulating body 1.

Each second conductive terminal 52 is provided with a second fixing portion 523 fixed in the second insulating block 51, a second resilient arm 521 extending forwardly from a front end of the second fixing portion 523, a second bent portion 524 bent downwardly from a rear end of the second fixing portion 523, and a second tail portion 522 extending backwardly from the second bent portion 524. The second resilient arm 521 extends beyond the second insulating block 51. The second resilient arm 521 is cantilevered and extends into the mating slot 110. The second resilient arm 521 is provided with a second contact portion 5211 for electrically mating with the mating connector. A plane in which the second tail portion 522 is located is lower than a plane in which the second fixing portion 523 is located. This design facilitates better installation of the second tail portions 522 in the receiving grooves 4142 of the first insulating block 41.

The first contact portions 4211 and the second contact portions 5211 extend toward the middle. That is, the first contact portions 4211 protrude toward the second contact portions 5211, and the second contact portions 5211 protrude toward the first contact portions 4211. With such arrangement, the first contact portions 4211 and the second contact portions 5211 can jointly clamp a tongue plate of the mating connector (not shown). The second tail portions 522 extend backwardly beyond the second insulating block 51. In the embodiment illustrated in the present disclosure, each of the first tail portions 422 of the first conductive terminals 42 and the second tail portions 522 of the second conductive terminals 52 is in a shape of a flat plate. The first tail portions 422 of the first conductive terminals 42 and the second tail portions 522 of the second conductive terminals 52 are located on the same side. In the embodiment illustrated in the present disclosure, the first tail portions 422 of the first conductive terminals 42 and the second tail portions 522 of the second conductive terminals 52 are exposed to the assembly surface 4141 so as to facilitate fixing to corresponding cables 200 by soldering or welding.

The first tail portions 422 of the first conductive terminals 42 and the second tail portions 522 of the second conductive terminals 52 are arranged in a row along a first direction A1.

Figure 8:
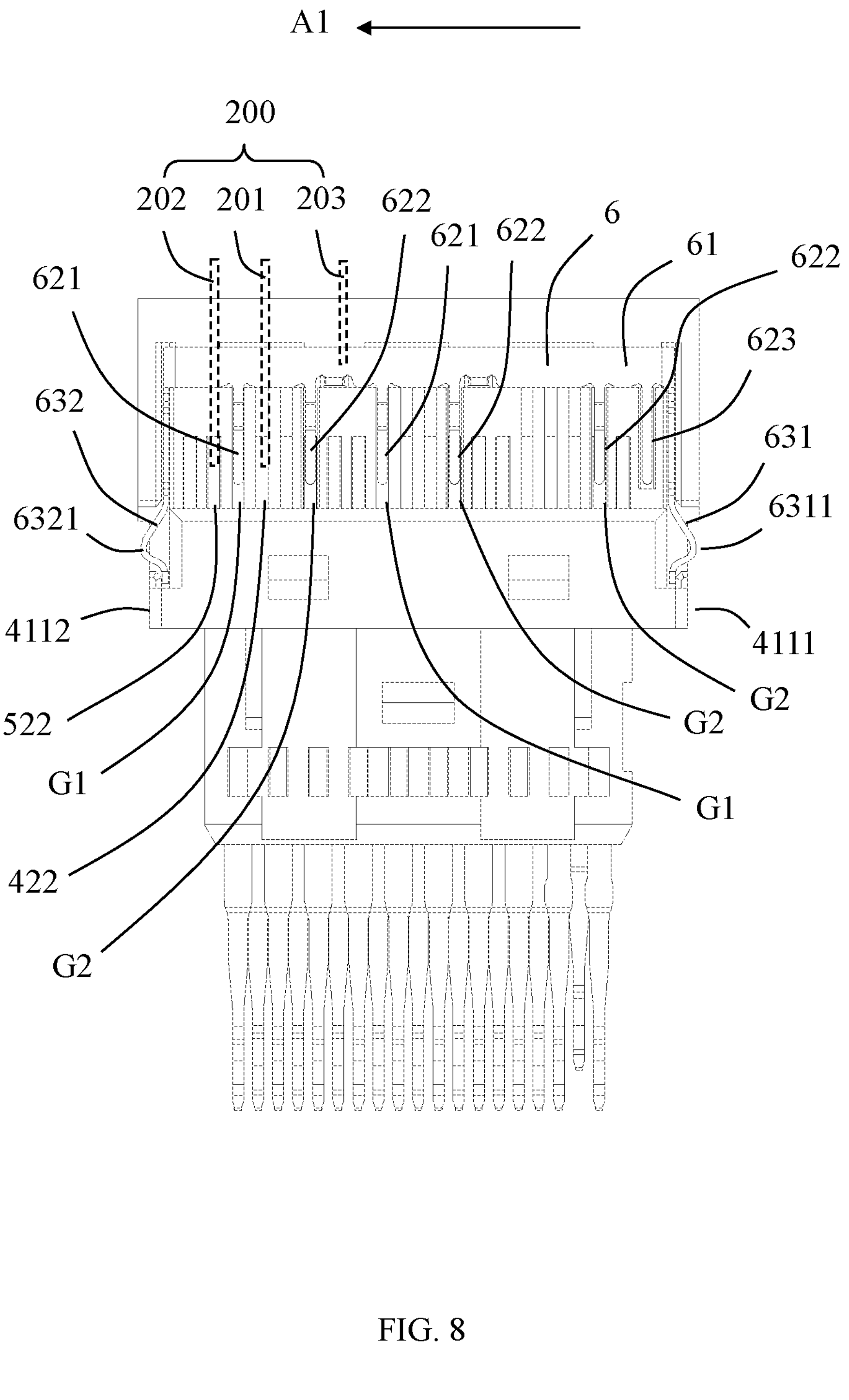
FIG. 8 is a top view of the terminal module in FIG. 6.
Figure 9:
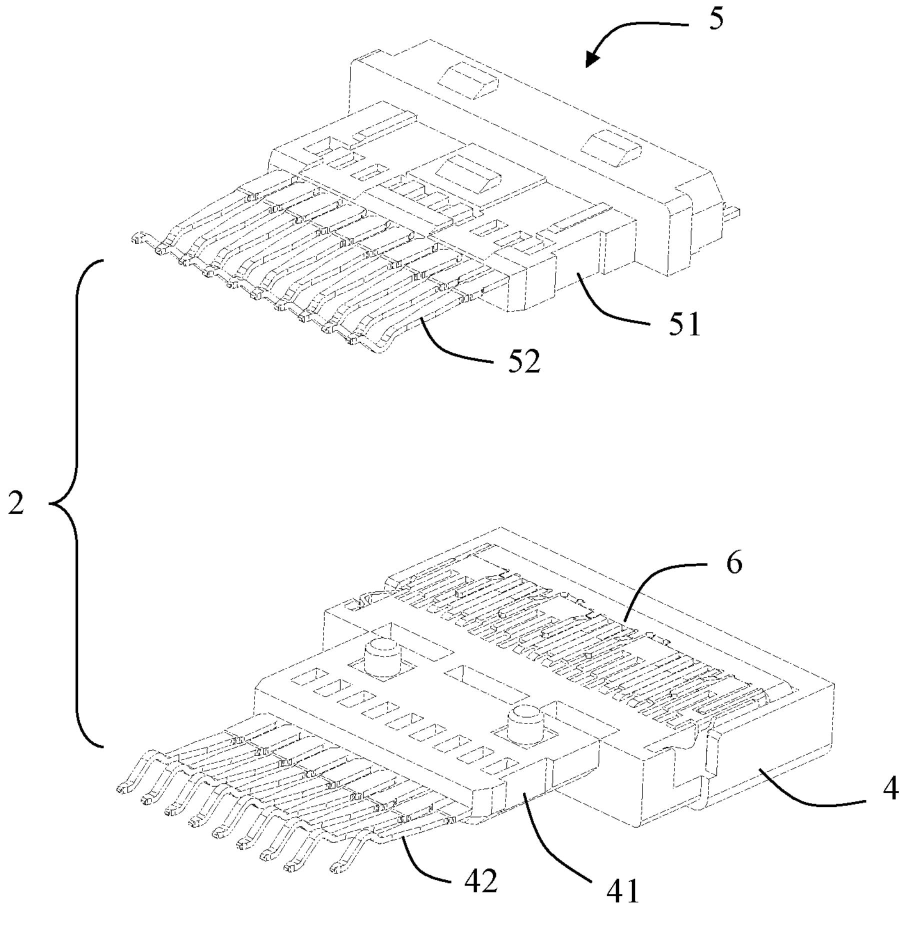
FIG. 9 is a partially exploded perspective view of the terminal module in FIG. 7.
Figure 12:
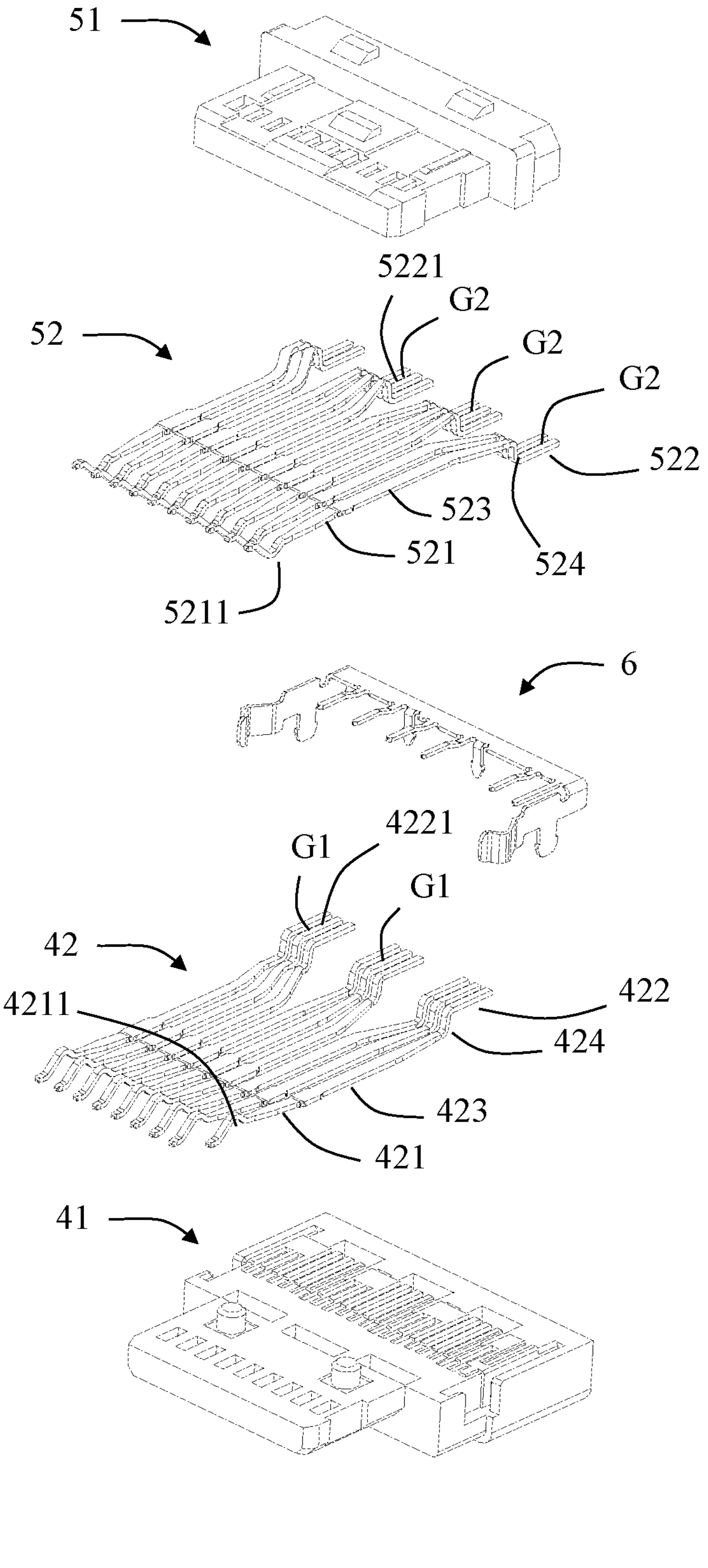
FIG. 12 is a further partially perspective exploded view of FIG. 10.
Figure 13:
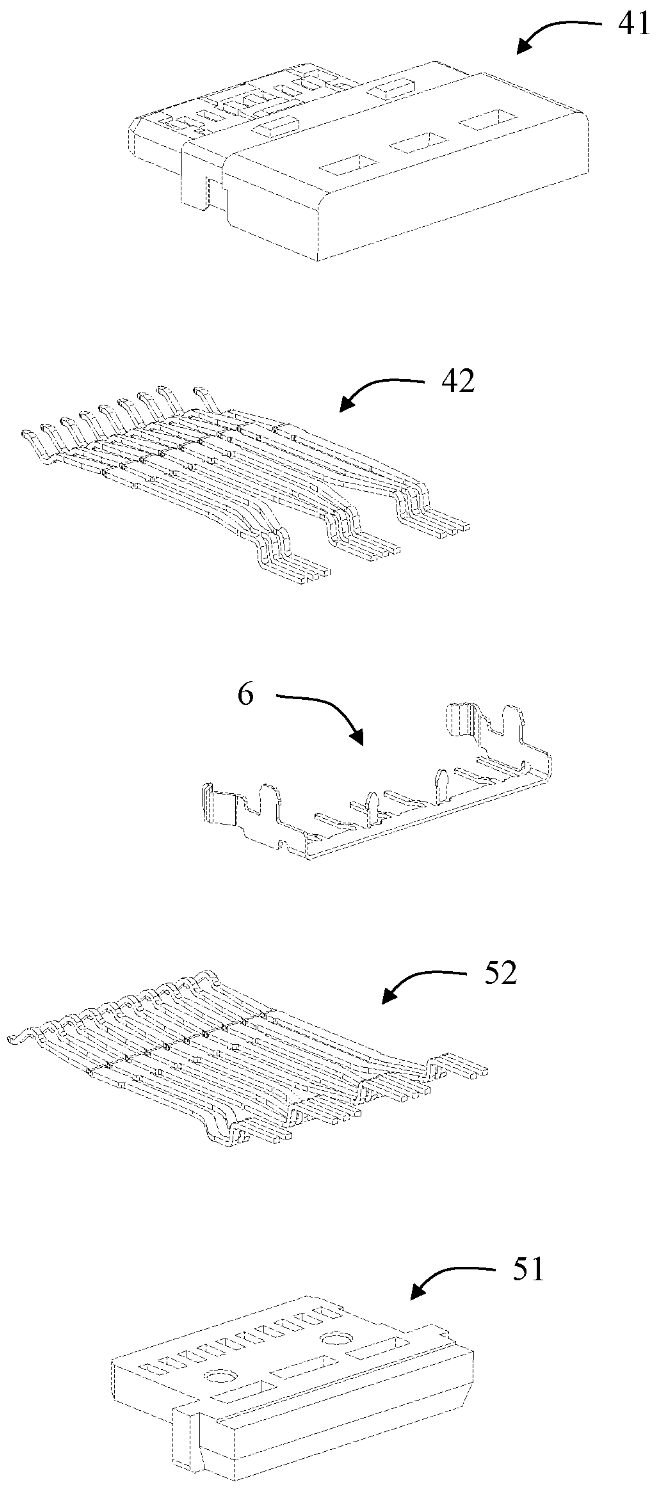
FIG. 13 is a partially perspective exploded view of FIG. 12 at another angle.
Figure 14:
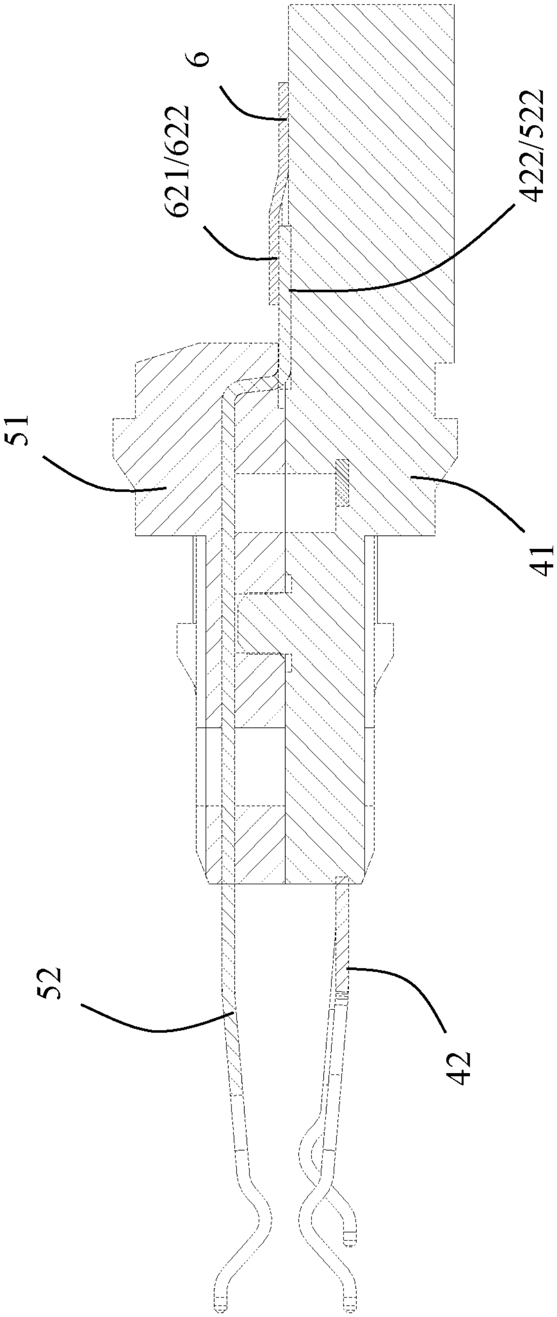
FIG. 14 is a schematic cross-sectional view taken along line C-C in FIG. 6.

Referring to FIG. 8 and FIG. 12, in the embodiment illustrated in the present disclosure, the first conductive terminals 42 include a plurality of first signal terminals and a plurality of first ground terminals G1. The second conductive terminals 52 include a plurality of second signal terminals and a plurality of second ground terminals G2.

Figure 10:
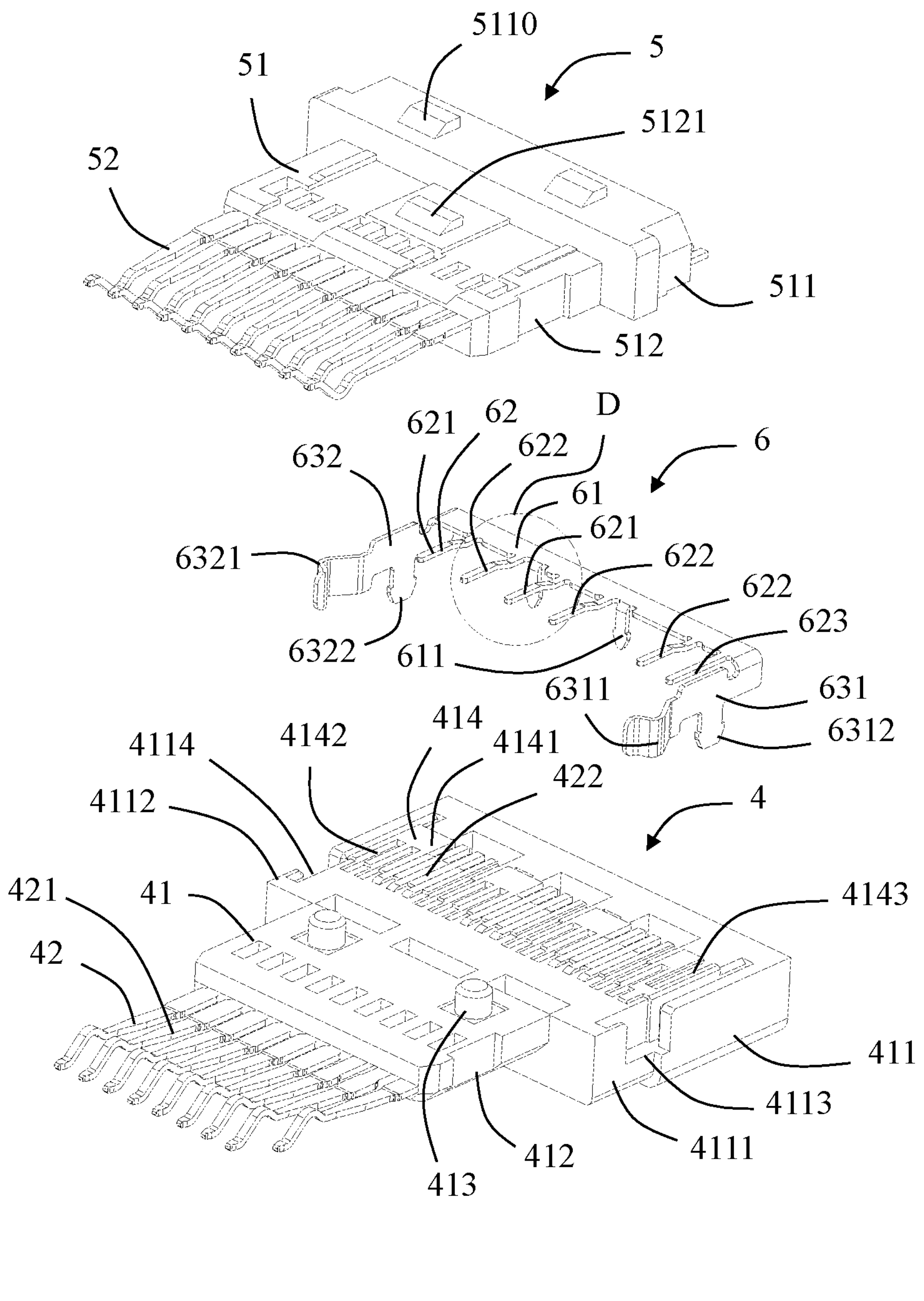
FIG. 10 is a partially perspective exploded view of FIG. 9 at another angle.
Figure 11:
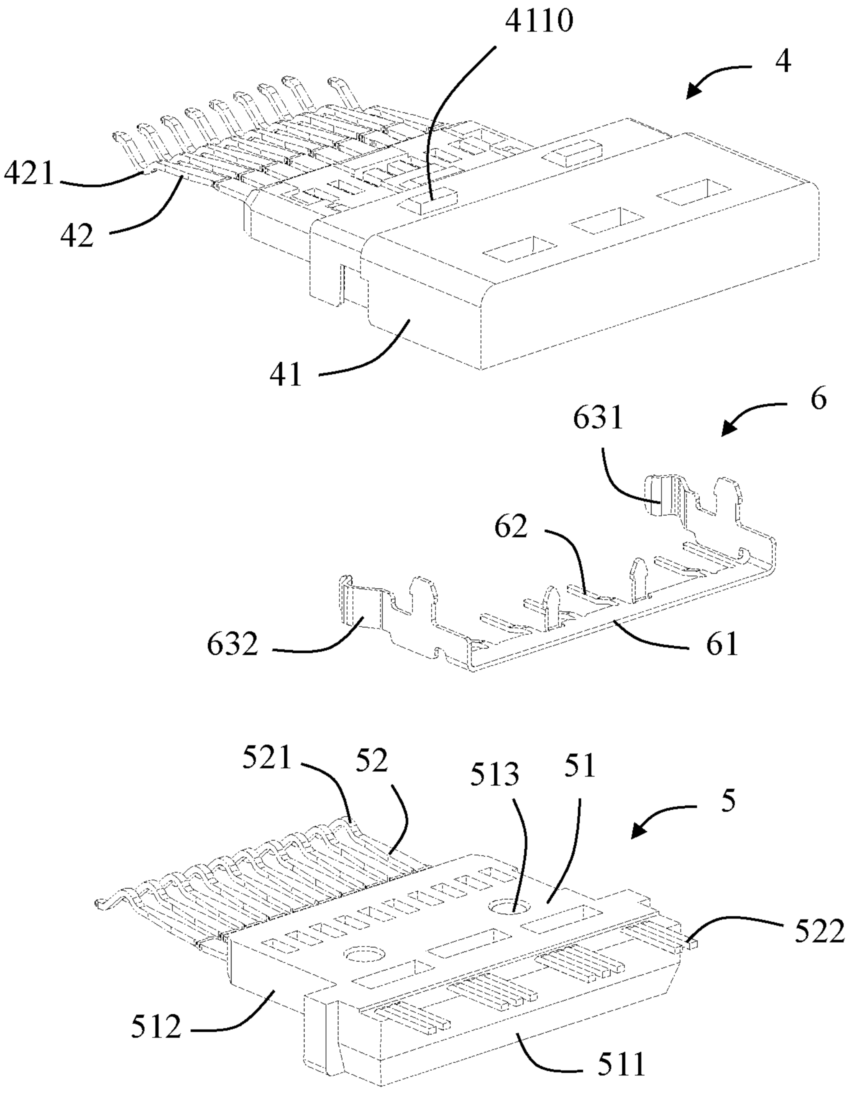
FIG. 11 is a partially perspective exploded view of FIG. 10 at another angle.
Figure 15:
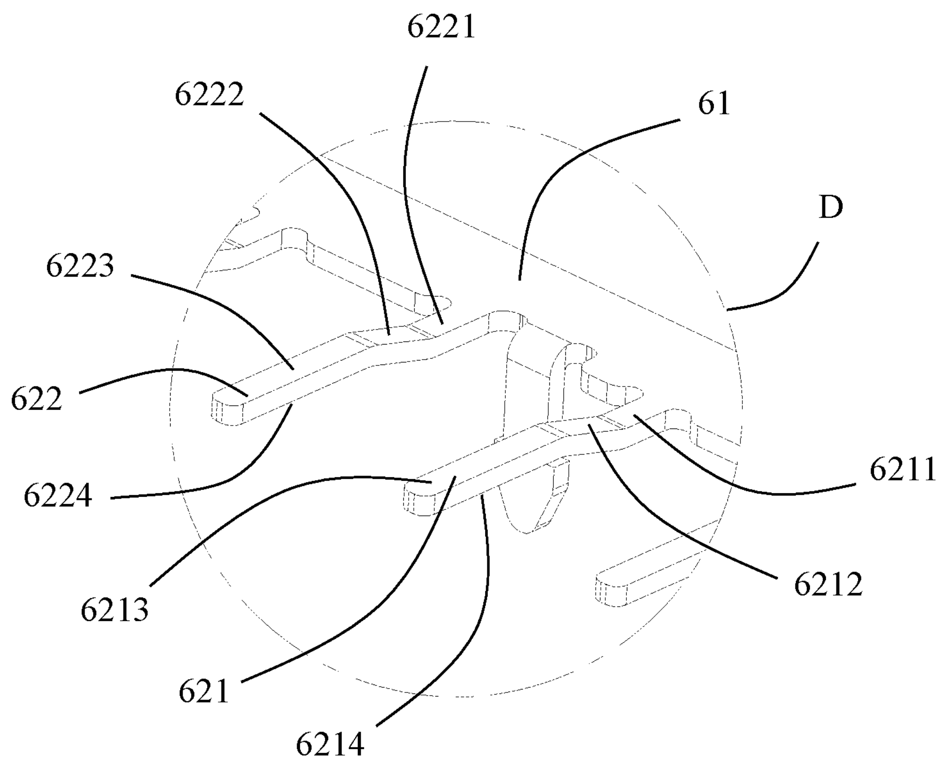
FIG. 15 is a partially enlarged view of a circled portion D of FIG. 10.

Referring to FIGS. 10 and 15, in the embodiment illustrated in the present disclosure, the grounding piece 6 is made of a metal material and is of a one-piece configuration. The grounding piece 6 is provided with a body portion 61, a plurality of grounding tabs 62 connected to the body portion 61, a first spring arm 631 extending forwardly from one side of the body portion 61, and a second spring arm 632 extending forwardly from the other side of the body portion 61. The first spring arm 631 is provided with a first curved protrusion 6311 protruding away from the second spring arm 632. The second spring arm 632 is provided with a second curved protrusion 6311 protruding away from the first spring arm 631. The first spring arm 631 and the second spring arm 632 are held in the first installation slot 4113 and the second installation slot 4114 of the first insulating block 41, respectively. The first curved protrusion 6311 and the second curved protrusion 6321 protrude beyond the first side wall surface 4111 and the second side wall surface 4112, respectively. The first curved protrusion 6311 and the second curved protrusion 6321 are abutted against the metal shell 3. In the embodiment illustrated in the present disclosure, the first curved protrusion 6311 and the second curved protrusion 6321 are abutted against the first sidewall portion 333 and the second sidewall portion 334 of the first metal shell 3*a*, respectively.

The grounding piece 6 includes a first fixing tab 6312 extending downwardly from the first spring arm 631 and a second fixing tab 6322 extending downwardly from the second spring arm 632. The first fixing tab 6312 and the second fixing tab 6322 are inserted in and fixed to the first insulating block 41. The body portion 61 is abutted against a rear end of the boss 414.

The grounding piece 6 further includes a plurality of third fixing tabs 611 bent from the body portion 61. The third fixing tabs 611 are inserted in and fixed to the first insulating block 41. Preferably, the first fixing tab 6312, the second fixing tab 6322 and the third fixing tabs 611 are provided with a plurality of barbs so as to improve the fixing effect with the first insulating block 41.

Figure 17:
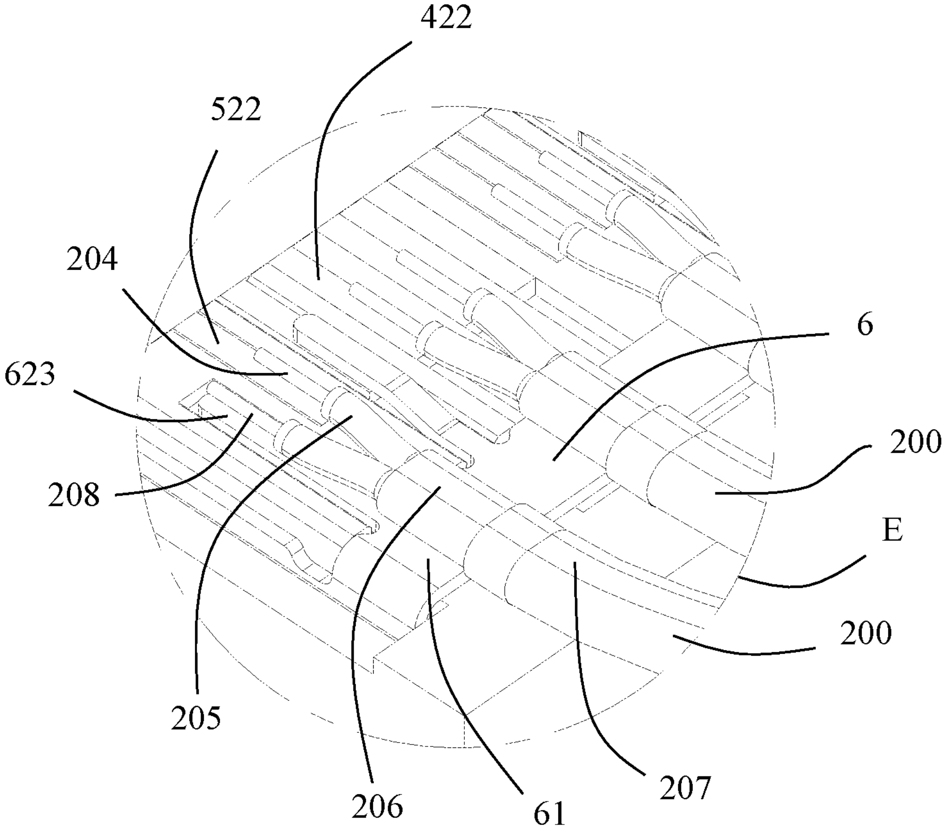
FIG. 17 is a partially enlarged view of a circled portion E in FIG. 16.

The plurality of grounding tabs 62 include a plurality of first grounding tabs 621 and a plurality of second grounding tabs 622. The grounding piece 6 further includes a back-up grounding tab 623 extending forwardly from the body portion 61. The back-up grounding tab 623 is received in the recess 4143 of the first insulating block 41. When the cables 200 are provided with a grounding cable 208 corresponding to the back-up grounding tab 623 (as shown in FIG. 17), the grounding cable 208 is in contact with the back-up grounding tab 623, for example through soldering or welding. When the cables 200 are not provided with a grounding cable corresponding to the back-up grounding tab 623, the back-up grounding tab 623 is not directly connected to the cables 200.

In the embodiment illustrated in the present disclosure, when the grounding piece 6 is fixed to the first insulating block 41, the first grounding tabs 621 are stacked at least partially on and in contact with the first tail portions 422 of the first ground terminals G1, and the second grounding tabs 622 are stacked at least partially on and in contact with the second tail portions 522 of the second ground terminals G2. With such arrangement, the grounding piece 6, the first ground terminals G1, the second ground terminals G2 and the metal shell 3 are connected together, thereby increasing the grounding area and improving the shielding effect.

Referring to FIG. 15, in the embodiment illustrated in the present disclosure, the first grounding tab 621 includes a first root portion 6211 connected to the body portion 61, a first inclined portion 6212 connected to the first root portion 6211, and a first extension portion 6213 connected to the first inclined portion 6212. The first extension portion 6213 is in contact with a corresponding first tail portion 422 of the first ground terminal G1. Specifically, the first tail portion 422 of the first ground terminal G1 includes a first plane 4221. The first extension portion 6213 includes a first abutting plane 6214 in contact with the first plane 4221. Preferably, the first grounding tab 621 is fixed to the first tail portion 422 of the first ground terminal G1 by soldering or welding.

The second grounding tab 622 includes a second root portion 6221 connected to the body portion 61, a second inclined portion 6222 connected to the second root portion 6221, and a second extension portion 6223 connected to the second inclined portion 6222. The second extension portion 6223 is in contact with a corresponding second tail portion 522 of the second ground terminal G2. Specifically, the second tail portion 522 of the second ground terminal G2 includes a second plane 5221. The second grounding tab 622 includes a second abutting plane 6224 in contact with the second plane 5221. Preferably, the second grounding tab 622 is fixed to the second tail portion 522 of the second ground terminal G2 by soldering or welding.

The first insulating block 41 and the second insulating block 51 are provided with mating buckling structures. In the illustrated embodiment of the present disclosure, the buckling structures include but not limited to the positioning posts 413 and the positioning holes 513.

In an embodiment of the present disclosure, the first tail portion 422 of the first signal terminal is configured to be soldered or welded to a first signal cable 201; and the second tail portion 522 of the second signal terminal is configured to be soldered or welded to a second signal cable 202. The first tail portion 422 of the first ground terminal G1 and the second tail portion 522 of the second ground terminal G2 are configured to be soldered or welded to a ground cable 203. The cables 200 include the first signal cable 201, the second signal cable 202 and the ground cable 203.

Compared to the prior art, the present disclosure includes the plurality of first conductive terminals 42 having the first ground terminal G1 and the plurality of second conductive terminals 52 having the second ground terminal G2. The grounding piece 6 includes the first grounding tab 621 and the second grounding tab 622. By making the first grounding tab 621 and the second grounding tab 622 contact the first tail portion 422 of the first ground terminal G1 and the second tail portion 522 of the second ground terminal G2, respectively, it simplifies the structure of the grounding piece 6 and also enables a shielding function.

Figure 16:
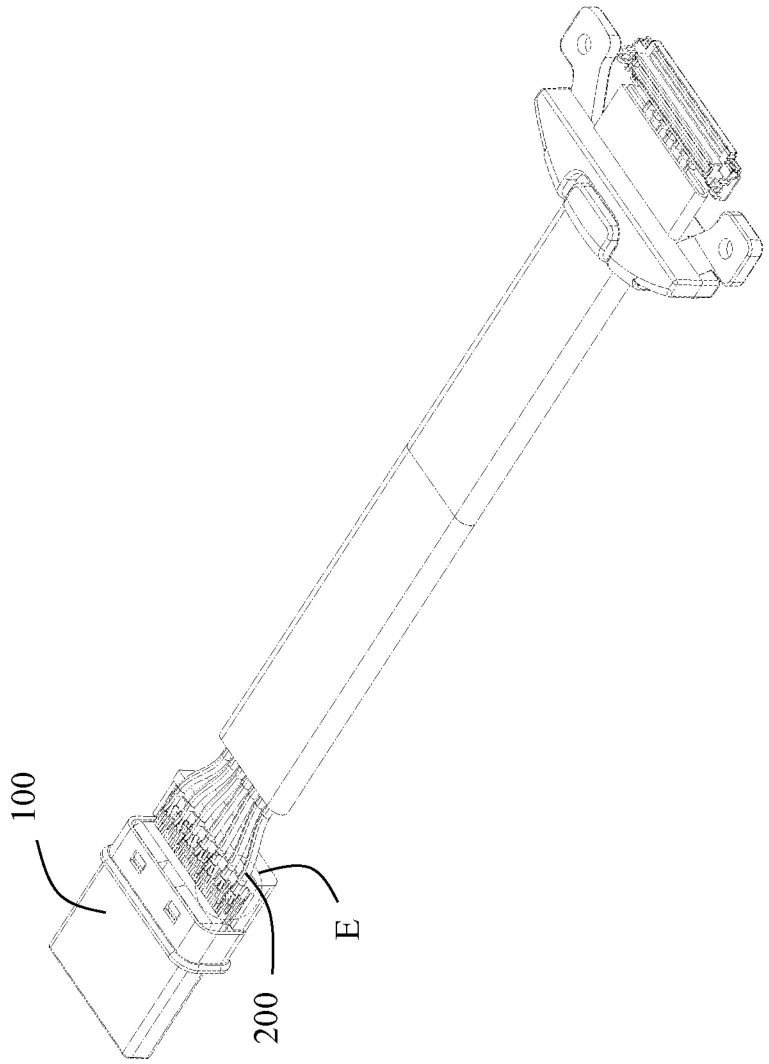
FIG. 16 is a partially perspective schematic view of the electrical connector of the present disclosure when assembled with cables.

As shown in FIG. 16 and FIG. 17, the electrical connector 100 is connected to the plurality of cables 200. In the illustrated embodiment of the present disclosure, the cable 200 is a coaxial cable which includes a plurality of inner conductors 204, a plurality of inner insulating layers 205, a shielding layer 206 wrapped around at least part of the inner insulating layers 205, and an outer insulating layer 207 wrapped around at least part of the shielding layer 206. The inner insulating layer 205 is wrapped around at least part of a corresponding inner conductor 204. The inner conductor 204 may be tin-plated copper or silver-plated copper.

When the plurality of cables 200 are connected to the electrical connector 100, the inner conductors 204 of the cables 200 are fixedly connected to the first tail portions 422 of the corresponding first conductive terminals 42 and the second tail portions 522 of the corresponding second conductive terminals 52, through soldering or welding for example, to achieve electrical connection. The shielding layer 206 is connected to the grounding piece 6 through soldering or welding for example, thereby increasing the shielding area and improving the shielding effect. When the cables 200 adopts coaxial cables of the present disclosure, the cables 200 can be directly soldered or welded to the electrical connector 100, which simplifies the process and reduces the cost.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body, the insulating body comprising a mating surface, a mounting surface opposite the mating surface, a mating slot extending through the mating surface, and a mounting space extending through the mounting surface; the mounting space being in communication with the mating slot;

a first terminal module, the first terminal module comprising a first insulating block and a plurality of first conductive terminals, each first conductive terminal comprising a first fixing portion fixed to the first insulating block, a first resilient arm extending from the first fixing portion, and a first tail portion; the first resilient arm being provided with a first contact portion extending into the mating slot;

a second terminal module, the second terminal module comprising a second insulating block and a plurality of second conductive terminals, each second conductive terminal comprising a second fixing portion fixed to the second insulating block, a second resilient arm extending from the second fixing portion, and a second tail portion, the second resilient arm being provided with a second contact portion extending into the mating slot, the first contact portions of the first conductive terminals and the second contact portions of the second conductive terminals being located on opposite sides of the mating slot, respectively; and a grounding piece, the grounding piece comprising a body portion and a plurality of grounding tabs connected to the body portion, the plurality of grounding tabs comprising a first grounding tab and a second grounding tab;

wherein the first tail portions of the plurality of first conductive terminals and the second tail portions of the plurality of second conductive terminals are located on a same side and arranged in a row in a first direction; the plurality of first conductive terminals comprise a first ground terminal; the plurality of second conductive terminals comprise a second ground terminal; the first grounding tab is stacked at least partially on the first tail portion of the first ground terminal and is in contact with the first tail portion of the first ground terminal; and the second grounding tab is stacked at least partially on the second tail portion of the second ground terminal and is in contact with the second tail portion of the second ground terminal.

2. The electrical connector according to claim 1, wherein the first tail portion of the first ground terminal comprises a first plane, and the first grounding tab comprises a first abutting plane in contact with the first plane; and wherein the second tail portion of the second ground terminal comprises a second plane, and the second grounding tab comprises a second abutting plane in contact with the second plane.

3. The electrical connector according to claim 2, wherein the first grounding tab is fixed to the first tail portion of the first ground terminal by soldering or welding; and the second grounding tab is fixed to the second tail portion of the second ground terminal by soldering or welding.

4. The electrical connector according to claim 1, wherein the first grounding tab comprises a first root portion connected to the body portion, a first inclined portion connected to the first root portion, and a first extension portion connected to the first inclined portion, the first extension portion is in contact with the first tail portion of the first ground terminal; and wherein the second grounding tab comprises a second root portion connected to the body portion, a second inclined portion connected to the second root portion, and a second extension portion connected to the second inclined portion, the second extension portion is in contact with the second tail portion of the second ground terminal.

5. The electrical connector according to claim 1, wherein the grounding piece further comprises a first spring arm extending from one side of the body portion and a second spring arm extending from another side of the body portion, the first spring arm is provided with a first curved protrusion protruding away from the second spring arm, and the second spring arm is provided with a second curved protrusion protruding away from the first spring arm.

6. The electrical connector according to claim 5, further comprising a metal shell sleeved on the insulating body; wherein the first spring arm and the second spring arm are abutted against the metal shell.

7. The electrical connector according to claim 5, wherein the grounding piece comprises a first fixing tab extending from the first spring arm and a second fixing tab extending from the second spring arm; and wherein the first fixing tab and the second fixing tab are inserted in and fixed to the first insulating block.

8. The electrical connector according to claim 7, wherein the grounding piece further comprises a third fixing tab bent from the body portion, and the third fixing tab is inserted in and fixed to the first insulating block.

9. The electrical connector according to claim 1, wherein the grounding piece further comprises a back-up grounding tab extending from the body portion, and the first insulating block defines a recess to receive the back-up grounding tab.

10. The electrical connector according to claim 1, further comprising a plurality of cables, part of the plurality of cables are connected to part of the first tail portions and another part of the plurality of cables are connected to part of the second tail portions; wherein the plurality of cables comprise a ground cable connected to the body portion.

11. The electrical connector according to claim 10, wherein the cable comprises a plurality of inner conductors, a plurality of inner insulating layers, a shielding layer wrapped around at least part of the inner insulating layers, and an outer insulating layer wrapped around at least part of the shielding layer; each inner insulating layer is wrapped around a corresponding inner conductor; and wherein the inner conductors of the cable are fixedly connected to the first tail portion of a corresponding first conductive terminal and to the second tail portion of a corresponding second conductive terminal; the shielding layer is connected to the grounding piece.

12. An electrical connector, comprising:

an insulating body comprising a mating surface and a mating slot extending through the mating surface;

a first terminal module comprising a plurality of first conductive terminals, each first conductive terminal comprising a first resilient arm and a first tail portion, the first resilient arm being provided with a first contact portion extending into the mating slot;

a second terminal module comprising a plurality of second conductive terminals, each second conductive terminal comprising a second resilient arm and a second tail portion, the second resilient arm being provided with a second contact portion extending into the mating slot, the first contact portions of the first conductive terminals and the second contact portions of the second conductive terminals being located on opposite sides of the mating slot, respectively;

a grounding piece comprising a body portion and a plurality of grounding tabs connected to the body portion, the plurality of grounding tabs comprising a first grounding tab and a second grounding tab; and a plurality of cables, part of the plurality of cables being connected to part of the first tail portions of the first conductive terminals, and another part of the plurality of cables are connected to part of the second tail portions of the second conductive terminals; the plurality of cables comprising a ground cable connected to the body portion;

wherein the first tail portions of the plurality of first conductive terminals and the second tail portions of the plurality of second conductive terminals are located on a same side and arranged in a row in a first direction; the plurality of first conductive terminals comprise a first ground terminal; the plurality of second conductive terminals comprise a second ground terminal; the first grounding tab is stacked at least partially on the first tail portion of the first ground terminal and is in contact with the first tail portion of the first ground terminal; and the second grounding tab is stacked at least partially on the second tail portion of the second ground terminal and is in contact with the second tail portion of the second ground terminal.

13. The electrical connector according to claim 12, wherein the first tail portion of the first ground terminal comprises a first plane, and the first grounding tab comprises a first abutting plane in contact with the first plane; and wherein the second tail portion of the second ground terminal comprises a second plane, and the second grounding tab comprises a second abutting plane in contact with the second plane.

14. The electrical connector according to claim 13, wherein the first grounding tab is fixed to the first tail portion of the first ground terminal by soldering or welding; and the second grounding tab is fixed to the second tail portion of the second ground terminal by soldering or welding.

15. The electrical connector according to claim 12, wherein the first grounding tab comprises a first root portion connected to the body portion, a first inclined portion connected to the first root portion, and a first extension portion connected to the first inclined portion, the first extension portion is in contact with the first tail portion of the first ground terminal; and wherein the second grounding tab comprises a second root portion connected to the body portion, a second inclined portion connected to the second root portion, and a second extension portion connected to the second inclined portion, the second extension portion is in contact with the second tail portion of the second ground terminal.

16. The electrical connector according to claim 12, wherein the grounding piece further comprises a first spring arm extending from one side of the body portion and a second spring arm extending from another side of the body portion, the first spring arm is provided with a first curved protrusion protruding away from the second spring arm, and the second spring arm is provided with a second curved protrusion protruding away from the first spring arm.

17. The electrical connector according to claim 16, further comprising a metal shell sleeved on the insulating body; wherein the first spring arm and the second spring arm are abutted against the metal shell.

18. The electrical connector according to claim 16, wherein the grounding piece comprises a first fixing tab extending from the first spring arm and a second fixing tab extending from the second spring arm; and wherein the first fixing tab and the second fixing tab are inserted in and fixed to the first insulating block.

19. The electrical connector according to claim 18, wherein the grounding piece further comprises a third fixing tab bent from the body portion, and the third fixing tab is inserted in and fixed to the first insulating block.

20. The electrical connector according to claim 18, wherein the grounding piece further comprises a back-up grounding tab extending from the body portion, and the first insulating block defines a recess to receive the back-up grounding tab.

* * * * *